United States Patent
Kita et al.

(10) Patent No.: US 10,995,844 B2
(45) Date of Patent: May 4, 2021

(54) BREATHER STRUCTURE OF TRANSMISSION

(71) Applicant: HONDA MOTOR CO., LTD., Tokyo (JP)

(72) Inventors: Hiroyuki Kita, Wako (JP); Takafumi Maruyama, Wako (JP); Katsuhisa Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/915,010

(22) Filed: Jun. 29, 2020

(65) Prior Publication Data
US 2021/0003204 A1 Jan. 7, 2021

(30) Foreign Application Priority Data
Jul. 1, 2019 (JP) .............................. JP2019-123202

(51) Int. Cl.
*F16H 57/02* (2012.01)
*F16H 57/027* (2012.01)

(52) U.S. Cl.
CPC . *F16H 57/027* (2013.01); *F16H 2057/02034* (2013.01)

(58) Field of Classification Search
CPC ................. F16H 57/02; F16H 57/027; F16H 2057/02034
See application file for complete search history.

(56) References Cited

U.S. PATENT DOCUMENTS

| | | | | |
|---|---|---|---|---|
| 6,719,096 B2* | 4/2004 | Mogi | ................... | F16H 57/027 184/6.23 |
| 8,025,137 B2* | 9/2011 | Sasaki | ................... | B60K 17/35 192/48.2 |
| 9,869,243 B2* | 1/2018 | Sotani | ................... | F02F 7/0068 |
| 2019/0203824 A1* | 7/2019 | Niwata | ................. | F16H 57/021 |

FOREIGN PATENT DOCUMENTS

JP 2016-176561 A 10/2016

* cited by examiner

*Primary Examiner* — Adam D Rogers
(74) *Attorney, Agent, or Firm* — Westerman, Hattori, Daniels & Adrian, LLP

(57) ABSTRACT

In a breather structure of a transmission, a gear chamber of the transmission is disposed between an engine and an electric motor control device for an electric motor, and a breather piping is inserted into a breather hole in an upper wall of the gear chamber. When viewed from above, in a vehicle width direction, a part of an intake system member and the electric power control device are overlapped together, and a part of the intake system member and the gear chamber are overlapped together. Therefore, a direction of water splashed up from a road surface and flowing forward is changed downward so that the breather hole is easily covered with water. However, since an atmosphere opening part of the breather piping is disposed above the electric motor chamber, even if the breather hole is covered with water, a breather function is not lost.

5 Claims, 4 Drawing Sheets

BREATHER STRUCTURE OF TRANSMISSION

BACKGROUND OF THE INVENTION

Field of the Invention

The present invention relates to a breather structure of a transmission for ventilating an inner space of the transmission connected to an engine.

Description of the Related Art

Japanese Patent Application Laid-open No. 2016-176561 has made known a technique in which, in order to prevent a breather function from being damaged due to a breather device of a transmission being covered by water, a recessed part is formed between a pair of mount bosses provided on a rear end surface of a transmission case, a mount bracket is fixed to the pair of mount bosses, and the breather device is disposed in the recessed part covered with the mount bracket.

In a hybrid automobile including an electric motor for traveling that is disposed at an end portion, on a side far from an engine, of an inside of a transmission, it is necessary to provide a breather hole and a breather piping of the transmission to an upper wall of an end portion, on a side close to the engine, of the transmission, in order to avoid splashes of oil splashed up by the electric motor. Moreover, in the hybrid automobile, if an attempt were made to dispose an electrified component and a control device therefor in an engine room, a density in the engine room would become high. Here, when a PCU (Power Control Unit) of the electric motor is disposed in an upper portion of the transmission, since the breather piping on the upper wall of the transmission is sandwiched between a side wall of the engine and a side wall of the PCU that are respectively positioned on opposite sides in a vehicle width direction, in a case of, for example, traveling on a flooded road with a high water level, water scooped up from a road surface by a sub-frame may be poured concentratedly onto an outlet of the breather piping along a front surface of a dash lower panel and a lower surface of a hood so that the breather hole is covered with water, thereby causing a possibility of damaging a breather function.

SUMMARY OF THE INVENTION

The present invention has been accomplished in light of the above circumstances, and it is an object thereof to ensure a breather function of a transmission by preventing intrusion of water from a breather piping provided on an upper wall of the transmission.

In order to achieve the object, according to a first aspect of the present invention, there is provided a breather structure of a transmission, the transmission comprising an electric motor and being connected in a vehicle width direction to an engine that includes an intake system member, the transmission further comprising an electric motor chamber housing therein the electric motor and a gear chamber housing therein a speed change mechanism, wherein the gear chamber is disposed between the engine and the electric motor chamber, an electric power control device for driving the electric motor is disposed above the transmission, and a breather piping is inserted into a breather hole provided in an upper wall of the gear chamber, wherein a part of the intake system member and the electric power control device are overlapped each other in the vehicle width direction when viewed from above, a part of the intake system member and the gear chamber are overlapped each other in the vehicle width direction when viewed from above, and the breather piping has an atmosphere opening part thereof that is disposed above the electric motor chamber.

In accordance with the first aspect, the transmission includes the electric motor and is connected in the vehicle width direction to the engine that includes the intake system member, the transmission further including: the electric motor chamber housing therein the electric motor; and the gear chamber housing therein the speed change mechanism. The gear chamber is disposed between the engine and the electric motor chamber, the electric power control device for driving the electric motor is disposed above the transmission, and the breather piping is inserted into the breather hole provided in the upper wall of the gear chamber. In a case where water enters a space between the engine and the electric power control device by being splashed up from a road surface so as to change a direction of the water forward in an upper part of an engine room, since a part of the intake system member and the electric power control device are overlapped each other in the vehicle width direction when viewed from above, and a part of the intake system member and the gear chamber are overlapped each other in the vehicle width direction when viewed from above, the direction of the water flowing forward is changed downward so that intrusion of water would easily occur through the breather hole provided in the upper wall of the gear chamber. However, the atmosphere opening part of the breather piping is disposed above the electric motor chamber, and therefore, even if the breather hole is covered by water, a breather function is not lost and it is possible to ensure the breather function via the atmosphere opening part of the breather piping that is not easily covered by water.

According to a second aspect of the present invention, in addition to the first aspect, the breather hole is surrounded in three directions by the intake system member, the electric power control device, and the engine when viewed from above.

In accordance with the second aspect, since the breather hole is surrounded in the three directions by the intake system member, the electric power control device, and the engine when viewed from above, if an outlet of the breather piping were provided immediately above the breather hole or in a vicinity thereof and opened to an atmosphere, intrusion of water would easily occur through the breather piping surrounded in the three directions by the intake system member, the electric power control device, and the engine. Therefore, due to moving a position of the atmosphere opening part of the breather piping, an effect of preventing intrusion of water through the breather piping becomes more effective.

According to a third aspect of the present invention, in addition to the second aspect, a mount member is disposed rearwardly of the atmosphere opening part of the breather piping, the transmission being supported on a vehicle body by the mount member.

In accordance with the third aspect, since the mount member by which the transmission is supported on the vehicle body is disposed rearwardly of the atmosphere opening part of the breather piping, it is possible to more reliably prevent the atmosphere opening part of the breather piping from being covered with water by blocking the water intruded from the rear side by the mount member.

According to a fourth aspect of the present invention, in addition to the third aspect, an auxiliary equipment of the engine or the transmission is disposed so that the atmosphere opening part of the breather piping is interposed between the auxiliary equipment and the electric power control device, the auxiliary equipment being arranged to be inclined so that a distance between the auxiliary equipment and the electric power control device is reduced in going forward.

In accordance with the fourth aspect, since the auxiliary equipment of the engine or the transmission is disposed so that the atmosphere opening part of the breather piping is interposed between the auxiliary equipment and the electric power control device, the auxiliary equipment being arranged to be inclined so that the distance between the auxiliary equipment and the electric power control device is reduced in going forward, it is possible to prevent the atmosphere opening part of the breather piping from being covered with water by blocking water intruded in the vehicle width direction by the auxiliary equipment and the electric power control device. In addition, it is also possible to more reliably prevent the atmosphere opening part of the breather piping from being covered with water, since the inclined auxiliary equipment blocks water intruded from the front side and guides forward water intruded from the rear side so as to discharge the water.

According to a fifth aspect of the present invention, in addition to the fourth aspect, the intake system member includes an air cleaner and a resonator, the air cleaner being disposed above the engine, the resonator protruding upward of the transmission from the air cleaner.

In accordance with the fifth aspect, since the intake system member includes the air cleaner and the resonator, the air cleaner is disposed above the engine, and the resonator protrudes upward of the transmission from the air cleaner, the intake system members can be compactly laid out by using a space above the engine and the transmission, and even if the breather hole is easily covered by water with the direction thereof changed by the resonator, it is possible to prevent intrusion of water through the breather hole by moving the position of the atmosphere opening part of the breather piping.

Note that an air cleaner 19 and a resonator 21 of an embodiment correspond to the intake system member of the present invention, a PCU 20 of the embodiment corresponds to the electric power control device of the present invention, a battery 22 of the embodiment corresponds to the auxiliary equipment of the present invention, and a breather cap 29 of the embodiment correspond to the atmosphere opening part of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be explained below based on FIG. 1 to FIG. 4. In the following description reference numbers corresponding to components of an exemplary embodiment are included only for ease of understanding, but the applicant's claims are not limited to the exemplary embodiment or to specific components of the exemplary embodiment.

Figure 1:
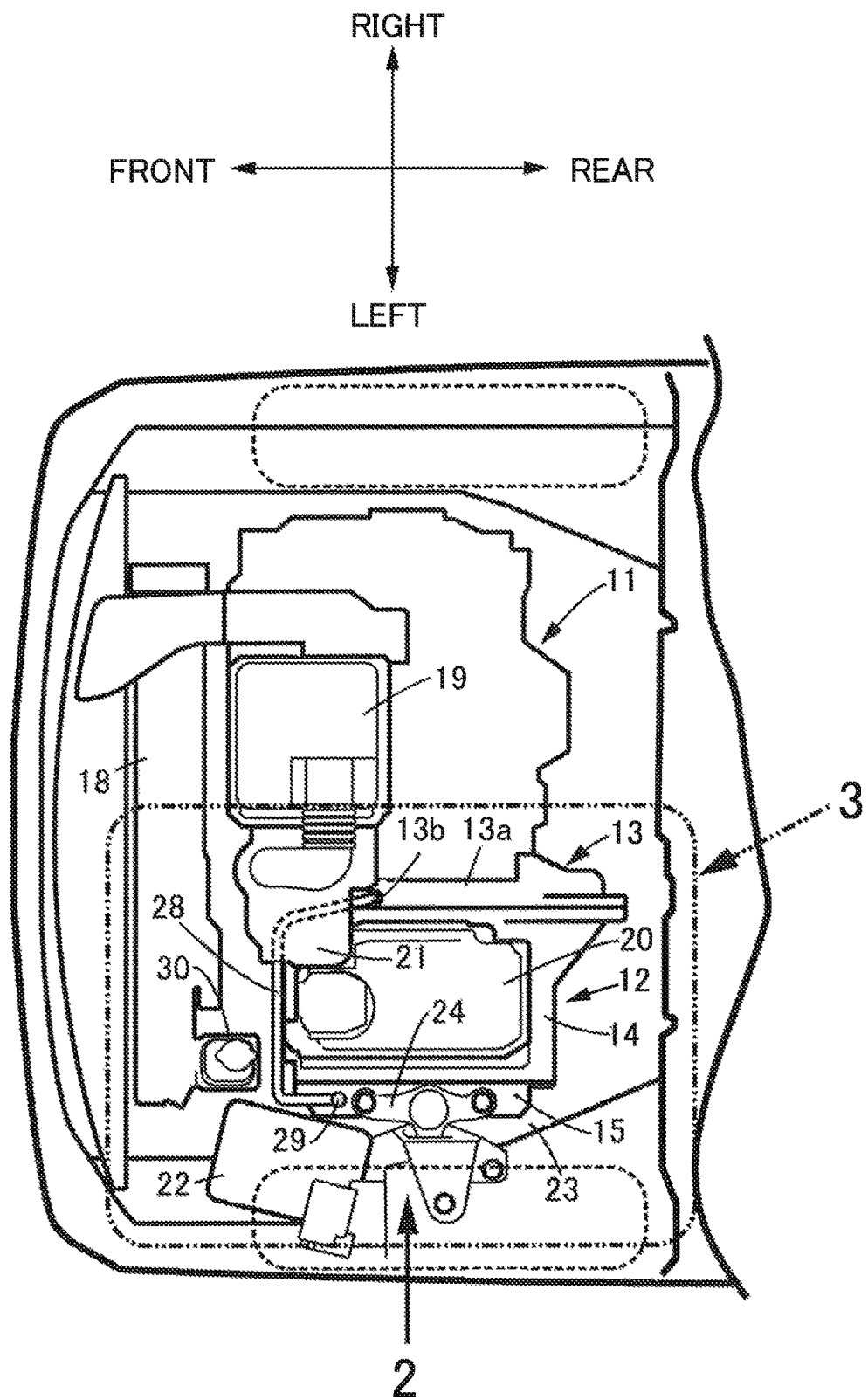
FIG. 1 is a schematic view of an engine room of an automobile as viewed from above.

As shown in FIG. 1, in an engine room of a hybrid automobile, an engine 11 is laterally mounted with a crankshaft thereof extending along a vehicle width direction, and a transmission 12 is connected to a left side surface of the engine 11. A casing of the transmission 12 is divided from the engine 11 side into a flywheel casing 13, a main body casing 14, and a cover 15. A gear chamber 16 (see FIGS. 3 and 4) housing therein a speed change mechanism and a flywheel is defined inside the flywheel casing 13 and a right half portion of the main body casing 14, and an electric motor chamber 17 (see FIGS. 3 and 4) housing therein an electric motor is defined inside the cover 15 and a left half portion of the main body casing 14. The electric motor housed in the electric motor chamber 17 generates a drive force for traveling the automobile, independently or in cooperation with the engine 11.

A radiator 18 is disposed forwardly of the engine 11 and the transmission 12 and extends in the vehicle width direction. An air cleaner 19 is disposed above a front portion of the engine 11, and a PCU (Power Control Unit) 20 for controlling operation of the electric motor is disposed above the transmission 12. A resonator 21 is provided on a left side surface of the air cleaner 19 and protrudes upward of the transmission 12.

A battery 22 with 12 volt is disposed so as to face a left side of the radiator 18 and a left side of a front portion of the transmission 12. A mount member 24 is disposed rearwardly of the battery 22, the transmission 12 being supported on a vehicle body frame 23 by the mount member 24. Note that although not illustrated, a waterproofing cover is attached to a terminal portion etc. of the battery 22, that is, the battery 22 is configured so as to have no problem even if the battery 22 is covered with water.

Figure 2:
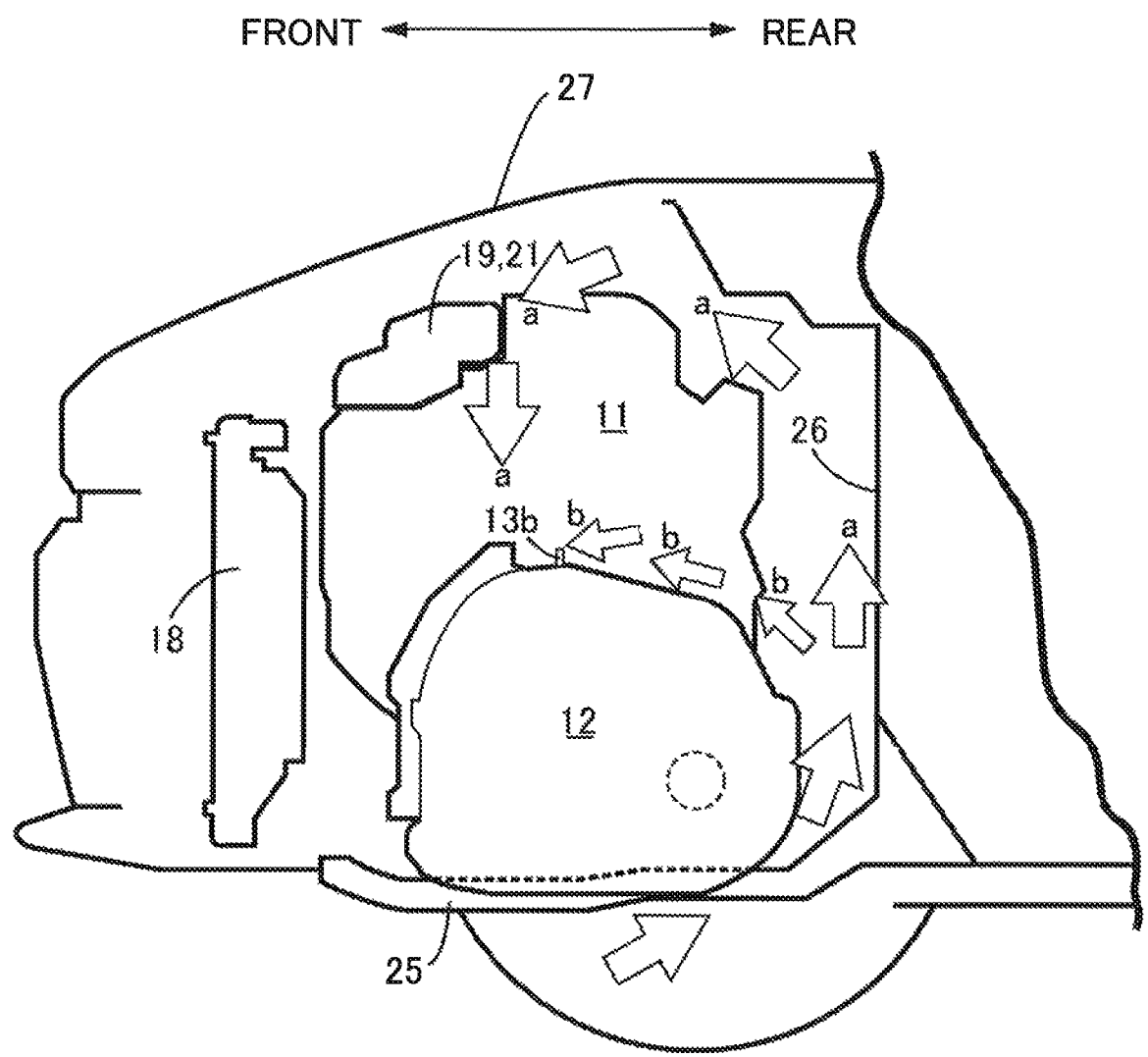
FIG. 2 is a schematic view from a direction of arrow 2 in FIG. 1.

As shown in FIG. 2, the engine 11 and the transmission 12 are supported on a front sub-frame 25 disposed in a lower part of the engine room and having a frame shape. A dash lower panel 26 is raised up in a rear part of the engine room, and an upper part of the engine room is covered by a hood 27.

Figure 3:
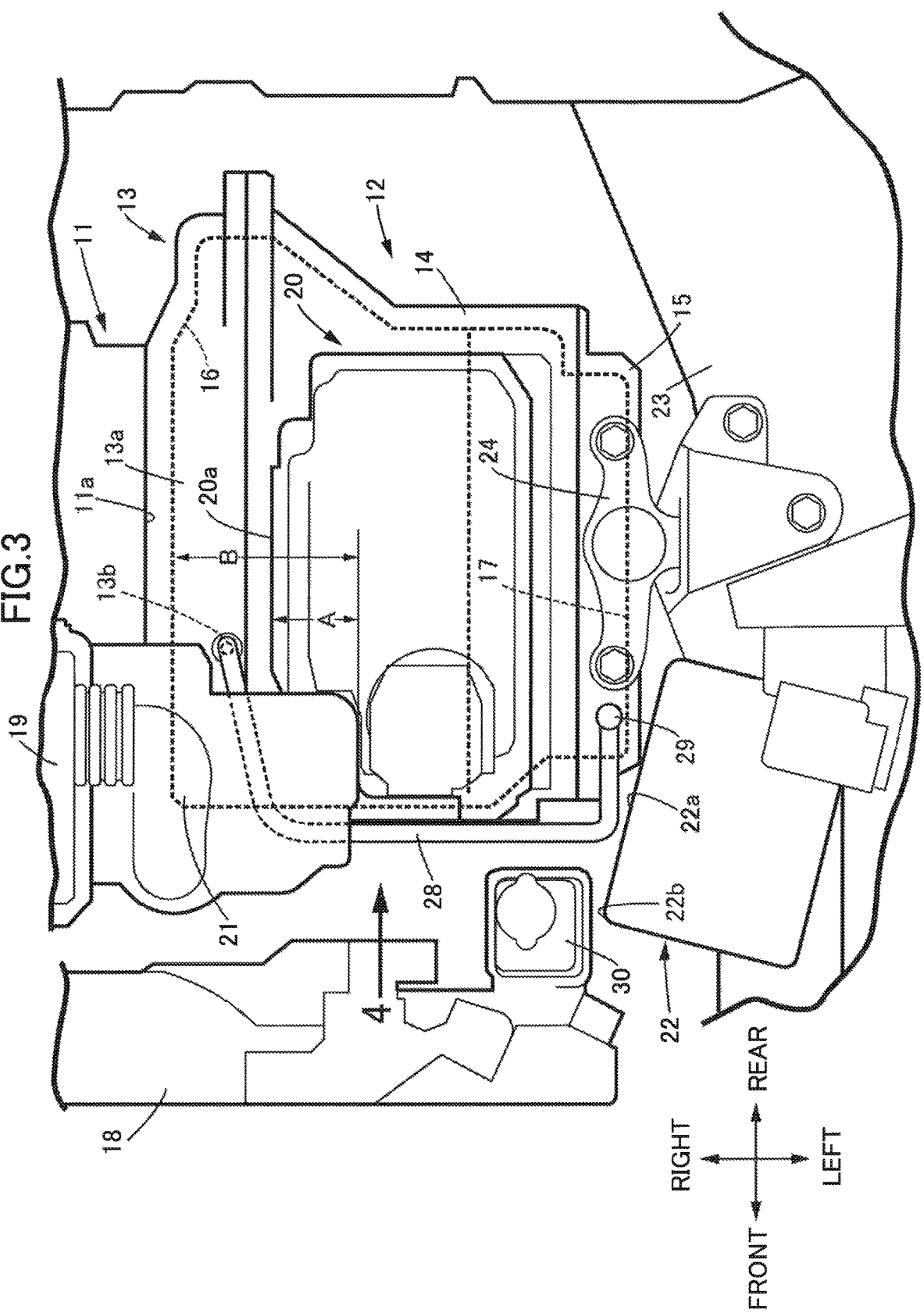
FIG. 3 is a detailed view corresponding to part 3 in FIG. 1.
Figure 4:
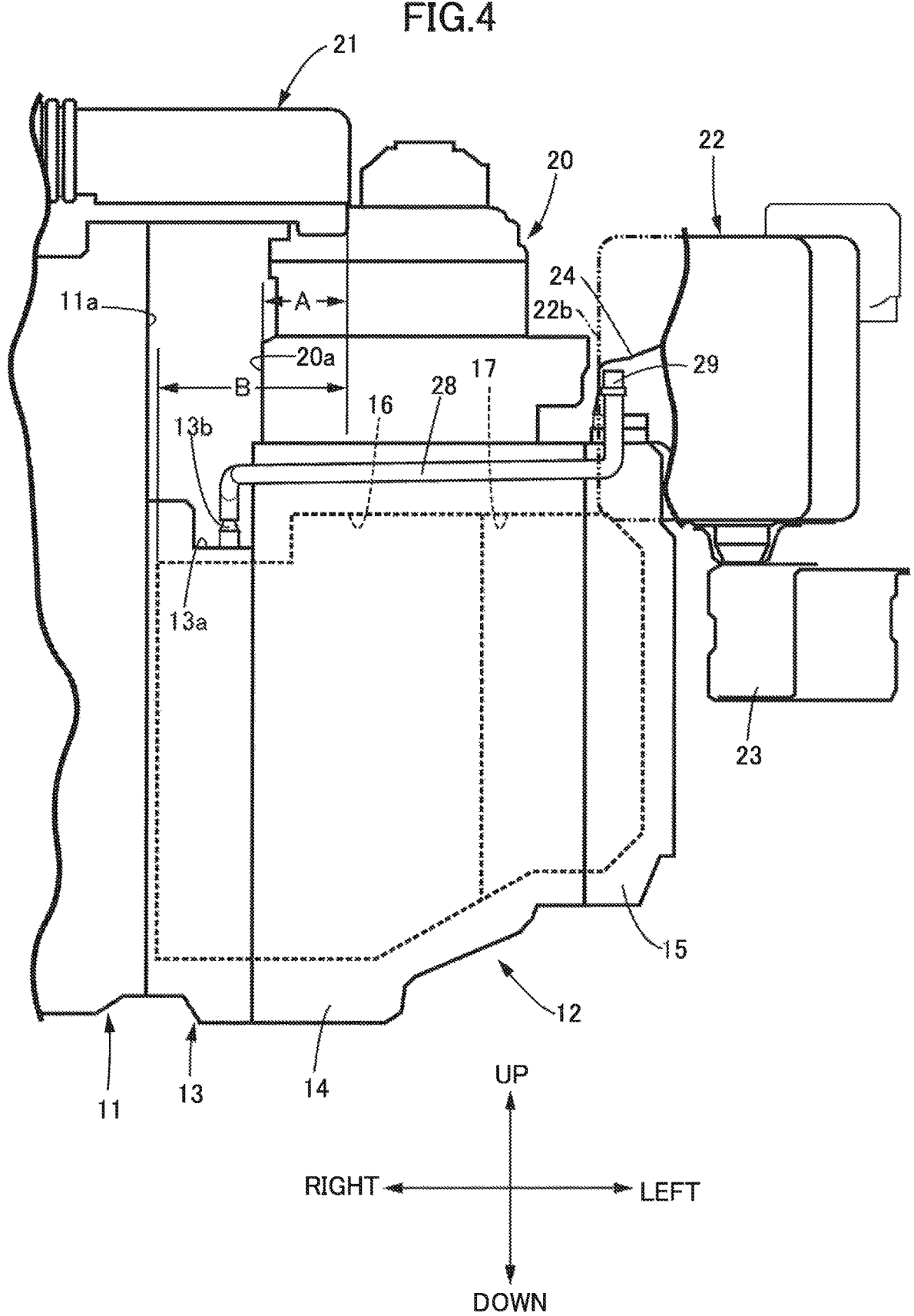
FIG. 4 is a view from a direction of arrow 4 in FIG. 3.

As shown in FIGS. 3 and 4, a breather hole 13b is formed in an upper wall 13a of the flywheel casing 13 and communicates with the gear chamber 16. The reason why the breather hole 13b is made to communicate with the gear chamber 16 is because if the breather hole 13b were made to communicate with the electric motor chamber 17, there is a possibility of easily discharging splashes of oil splashed up inside the electric motor chamber 17 by the electric motor rotating at a high speed, as compared with a case where the breather hole 13b is provided in the gear chamber 16.

A left side wall 11a of the engine 11 is positioned on a right side of the flywheel casing 13 of the transmission 12, and a right side wall 20a of the PCU 20 is positioned on a left side of the flywheel casing 13. Accordingly, the breather hole 13b is disposed at a position sandwiched from both left and right sides by the right side wall 20a of the PCU 20 and the left side wall 11a of the engine 11. Moreover, the resonator 21 provided at a left end of the air cleaner 19 protrudes forward and upward of the breather hole 13b.

That is, as is clear from FIGS. 3 and 4 showing the engine room as viewed from above and the front, respectively, the resonator 21 and the PCU 20 are overlapped each other by a distance A in the vehicle width direction, and the resonator 21 and the gear chamber 16 are overlapped each other by a distance B in the vehicle width direction. Thus, the breather hole 13b is surrounded from front, left, and right sides by the resonator 21, the PCU 20, and the engine 11.

The breather piping 28 has one end thereof connected to the breather hole 13b, the breather piping 28 extending forward, then bending leftward, detouring around a front surface of the transmission 12, further bending rearward, and reaching an upper side of the cover 15 of the transmission 12. A breather cap 29 is provided at an open end of the breather piping 28.

The radiator 18 is disposed forwardly of the engine 11 and the transmission 12, and an expansion tank 30 for cooling the PCU 20 is positioned at a right front of the breather cap 29. The battery 22 with 12 volt as an auxiliary equipment of the engine 11 and the transmission 12 is disposed to be inclined on a left side of the breather cap 29. That is, a front side of a right side wall 22a of the battery 22 is inclined to the right when viewed from above, and a corner portion 22b provided at a right front end of the battery 22 protrudes forwardly of the breather cap 29. However, a gap is formed between the corner portion 22b at the right front end of the battery 22 and the expansion tank 30 for cooling the PCU 20. A left end portion of the transmission 12 is supported on the vehicle body frame 23 via the mount member 24, and the mount member 24 is positioned rearwardly of the breather cap 29.

Next, the operation of the embodiment of the present invention including the above configuration will be explained.

In FIG. 2, in a case of, for example, traveling on a flooded road with a high water level, water, which has been scooped up from a road surface by the front sub-frame 25 with a frame shape, changes a direction thereof upwardly along a front surface of the dash lower panel 26, and further moves forward above the engine 11 and the transmission 12 along a lower surface of the hood 27 (see arrows a in FIG. 2). Part of the water is blocked by the air cleaner 19 and the resonator 21, and falls down in a groove-shaped space sandwiched by the left side wall 11a of the engine 11, the right side wall 20a of the PCU 20, and the upper wall 13a of the flywheel casing 13, so that the breather hole 13b provided in the space is easily covered with water.

However, according to the present embodiment, the breather hole 13b is not open immediately thereabove to the atmosphere, but the breather cap 29 at a tip end of the breather piping 28 connected to the breather hole 13b is open to the atmosphere, and therefore, a breather function of the transmission 12 can be ensured while preventing intrusion of water through the breather hole 13b.

Since part of water reflected forward on the dash lower panel 26 flows forward along an upper surface of the cover 15 at a left end of the transmission 12 (see arrows b in FIG. 2), the breather cap 29 of the breather piping 28 provided above the cover 15 would be easily covered with water. However, since the mount member 24 by which the transmission 12 is supported on the vehicle body frame 23 is provided rearwardly of the breather cap 29, the mount member 24 blocks the water flowing forward so that the breather cap 29 can be prevented from being covered with water.

Moreover, since the battery 22 on the left side of the breather cap 29 is disposed obliquely, and the front side of the right side wall 22a of the battery 22 is inclined to the right, the water flowing forward along the upper surface of the transmission is guided along the right side wall 22a of the battery 22 and discharged forward from the gap between the corner portion 22b at the right front end of the battery 22 and the expansion tank 30 of the PCU 20, thereby preventing the water from staying around the breather cap 29. Further, water flowing rearward toward the breather cap 29 from the front is blocked by the corner portion 22b at the right front end of the battery 22 so as to be difficult to reach the breather cap 29, and therefore, the breather cap 29 can be more reliably prevented from being covered with water.

Furthermore, since the air cleaner 19 is disposed above the engine 11, and the resonator 21 protrudes upward of the transmission 12 from the air cleaner 19, the intake system members can be compactly laid out by using a space above the engine 11 and the transmission 12.

An embodiment of the present invention is explained above, but the present invention may be modified in a variety of ways as long as the modifications do not depart from the gist of the present invention.

For example, the auxiliary equipment of the present invention is not limited to the battery 22 of the embodiment.

Moreover, in addition to the PCU 20 of the embodiment, for example intake components and auxiliary equipment components of the engine and the battery of the motor are disposed on the upper side of the transmission 12, and even in a case of an arrangement surrounded in three directions by these members, the present invention becomes effective.

Further, the intake system member of the present invention is not limited to the air cleaner 19 and the resonator 21.

What is claimed is:

1. A breather structure of a transmission, the transmission comprising an electric motor and being connected in a vehicle width direction to an engine that includes an intake system member, the transmission further comprising an electric motor chamber housing therein the electric motor and a gear chamber housing therein a speed change mechanism,
wherein the gear chamber is disposed between the engine and the electric motor chamber,
an electric power control device for driving the electric motor is disposed above the transmission, and
a breather piping is inserted into a breather hole provided in an upper wall of the gear chamber,
wherein a part of the intake system member and the electric power control device overlap with each other in the vehicle width direction when viewed from above,
a part of the intake system member and the gear chamber overlap with each other in the vehicle width direction when viewed from above, and
the breather piping has an atmosphere opening part thereof that is disposed above the electric motor chamber.

2. The breather structure of a transmission according to claim 1, wherein the breather hole is surrounded in three directions by the intake system member, the electric power control device, and the engine when viewed from above.

3. The breather structure of a transmission according to claim 2, wherein a mount member is disposed rearwardly of the atmosphere opening part of the breather piping, the transmission supported on a vehicle body by the mount member.

4. The breather structure of a transmission according to claim 3, wherein an auxiliary equipment of the engine or the transmission is disposed so that the atmosphere opening part of the breather piping is interposed between the auxiliary equipment and the electric power control device, the auxiliary equipment arranged to be inclined so that a distance between the auxiliary equipment and the electric power control device is reduced in going forward.

5. The breather structure of a transmission according to claim 4, wherein the intake system member includes an air cleaner and a resonator, the air cleaner disposed above the engine, the resonator protruding upward of the transmission from the air cleaner.

* * * * *